United States Patent [19]

Kuroda et al.

[11] Patent Number: 4,791,485

[45] Date of Patent: Dec. 13, 1988

[54] SYSTEM FOR DETECTING A TRANSMISSION ERROR

[75] Inventors: Hideo Kuroda, Yokosuka; Naoki Mukawa, Isehara; Makoto Hiraoka, Tokyo; Kiichi Matsuda, Kawasaki; Mitsuo Nishiwaki; Shuzo Tsugane, both of Tokyo, all of Japan

[73] Assignees: Nippon Telegraph & Telephone Public Corporation, Tokyo; Fujitsu Limited, Kawasaki; NEC Corporation, Tokyo, all of Japan

[21] Appl. No.: 929,435

[22] Filed: Dec. 19, 1986

Related U.S. Application Data

[63] Continuation of Ser. No. 620,516, Jun. 14, 1984, Pat. No. 4,677,480.

[30] Foreign Application Priority Data

Jun. 16, 1983 [JP] Japan ............................ 58-106806

[51] Int. Cl.$^4$ ............................................. H04N 7/12
[52] U.S. Cl. .................................... 358/136; 371/54; 375/26
[58] Field of Search ..................... 358/136; 371/53, 54; 375/26, 27

[56] References Cited

U.S. PATENT DOCUMENTS 3,484,744 12/1969 Gertler et al. ..................... 371/53
3,573,726 4/1971 Towell ............................. 371/54
3,753,225 8/1973 Liddell ............................ 371/54
4,047,221 9/1977 Yasuda et al. ..................... 358/136

FOREIGN PATENT DOCUMENTS 806836 12/1958 United Kingdom ................. 371/54

Primary Examiner—Robert L. Griffin
Assistant Examiner—Leslie Van Beek
Attorney, Agent, or Firm—Staas & Halsey

[57] ABSTRACT

An inter-frame encoding/decoding equipment for television signals consists of inter-frame encoding equipment encoding a difference between television signals and the output of a frame memory and inter-frame decoding equipment which receives an encoded signal sent from the inter-frame encoding device via a transmission line, which decodes by adding the output of the frame memory to the encoded signal. The inter-frame encoding equipment is provided with a first operation circuit which operates the remainders obtained by dividing, by a predetermined value, the number of bits of logic "1" in the bit groups into which the output or the input of the frame memory is divided by a predetermined unit. The inter-frame decoding equipment is provided with a second operation circuit which operates the remainders obtained by dividing, by a predetermined value, the number of bits of logic "1" in the bit groups into which the output or the input of the frame memory is divided by a predetermined unit. The inter-frame decoding equipment is further provided with a comparator circuit which compares and checks the values operated by the first and the second operation circuits to detect a transmission error.

11 Claims, 7 Drawing Sheets

| Fig. 9A |
| Fig. 9B |

SYSTEM FOR DETECTING A TRANSMISSION ERROR

This is a continuation of co-pending application Ser. No. 620,516 filed on June 14, 1984 now U.S. Pat. No. 4,677,480.

BACKGROUND OF THE INVENTION

1. Field of the Invention

The present invention relates to a system for detecting a transmission error in digital television signals that are encoded by an inter-frame encoding system.

2. Description of the Prior Art

An inter-frame encoding/decoding system compresses the transmission band by transmitting an estimated error only, with a decoded digital television signal of a preceding frame as a predicted value. Therefore, the predicted value produced by inter-frame encoding equipment must be in agreement with the predicted value of an inter-frame decoding device. When a decoded error has occurred in the digital television signals decoded by the inter-frame decoding equipment due to a transmission error, the error remains in the decoded digital television signals unless it is corrected by some method. Therefore, the detection of a transmission error, or the detection of the fact that the predicted value of the decoding equipment is different from the predicted value of the encoding equipment, is important in the inter-frame encoding/decoding system.

A cyclic redundancy check code (CRC) system has been generally used to detect a transmission error. Even with the system for detecting a transmission error based upon the CRC system, however, as well known, sometimes the transmission error can not be detected. When a transmission error is not detected, the decoded error is left in the decoded digital television signals.

OBJECTS AND SUMMARY OF THE INVENTION

An object of the present invention is to provide a system which is capable of detecting transmission errors more reliably than the CRC system.

Another object of the present invention is to provide a system which is capable of detecting transmission errors by requiring reduced amounts of redundancy bits compared to the CRC system.

The above-mentioned objects can be achieved by providing inter-frame encoding/decoding equipment for television signals which includes inter-frame encoding equipment which encodes the difference between television signals and the output of the input of a first frame memory, and inter-frame decoding equipment which receives encoded signals sent from the inter-frame encoding device via a transmission line and decodes by adding the output of a second frame memory to the encoded signal. A system for detecting a transmission error is included by providing the inter-frame encoding equipment with a first operation circuit which generates first remainders obtained by dividing, by a predetermined value, the number of bits of logic "1" in bit groups of the output or the input of first frame memory, and providing the inter-frame decoding equipment with a second operation circuit which generates second remainders obtained by dividing, by a predetermined value, the number of bits of logic "1" in the bit groups of the output or the input of the second frame memory and a comparator circuit which compares and checks the remainders generated by the first and second operation circuits to detect the transmission error.

Further features and advantages of the present invention will be apparent from the ensuing description with reference to the accompanying drawings in which, however, the scope of the invention is in no way limited.

DESCRIPTION OF THE PREFERRED EMBODIMENTS

Figure 1:
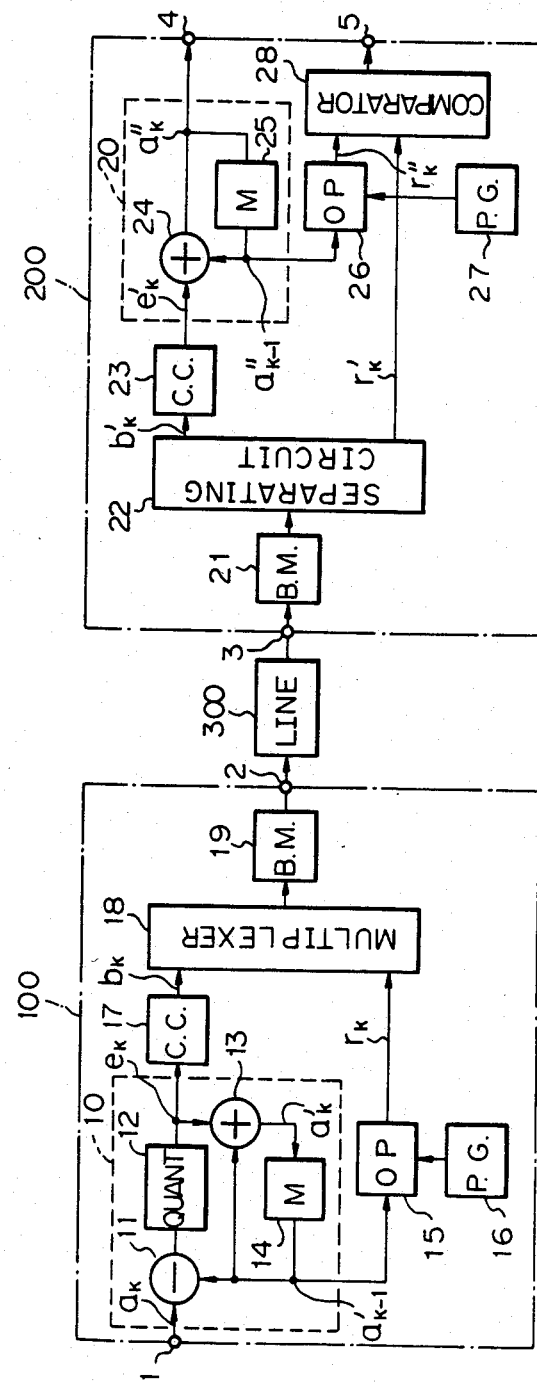
FIG. 1 is a block diagram illustrating an embodiment of the present invention.

FIG. 1 is a block diagram illustrating a system for detecting a transmission error according to an embodiment of the present invention. Reference numeral 100 denotes inter-frame encoding equipment, 200 denotes inter-frame decoding equipment, and 300 denotes a transmission line.

First, described below is the inter-frame encoding equipment 100. A digital television signal $a_k$ is input to an input terminal 1, and a subtractor 11 calculates the difference (predicted error) relative to the predicted value (decoded digital television signal of a preceding frame) $a'_{k-1}$ stored in a memory 14. The predicted error is quantized by a quantizer 12 to make it suitable for inter-frame encoding. The predicted error $e_k$, after being quantized, is added by the adder 13 to the predicted value $a'_{k-1}$ to decode $e_k$ into a decoded digital television signal $a'_k$, and $e_k$ is also sent to a code converter circuit 17. The decoded signal $a'_k$ is stored in the memory 14 as a decoded predicted value for the next frame. The predicted error $e_k$ sent to the code converter circuit 17 is therein subjected to code conversion (such as variable length encoding or block encoding) to be suitable for being inter-frame encoded. Reference numeral 16 denotes a pulse generator circuit, and 15 denotes an operation circuit. The pulse generator circuit 16 generates pulses for determining the period of arithmetic operation of the operation circuit 15 and further generates fundamental clock pulses. The operation circuit 15 divides the predicted value $a'_{k-1}$ read from the memory 14 into predetermined bit groups maintaining a pulse period generated by the pulse generator circuit 16 and divides the number of bits of logic "1" present in the bit groups by a predetermined value to calculate a remainder for each of the bit groups.

Figure 2:
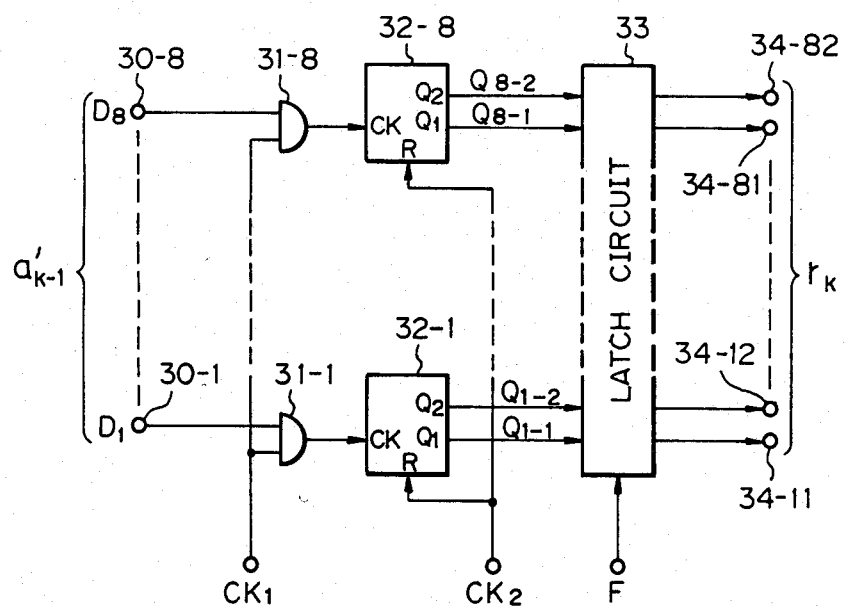
FIG. 2 is a block diagram illustrating the operation circuit of FIG. 1.
Figure 3:
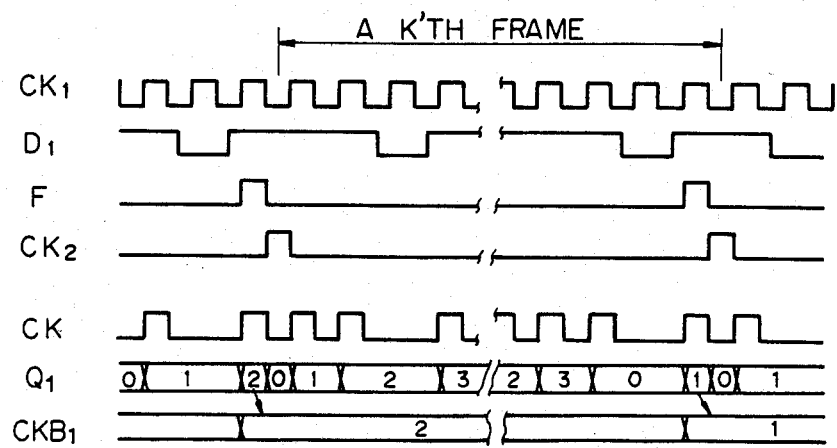
FIG. 3 is an operation time chart for the operation circuit of FIG. 2.

FIG. 2 is a block diagram of a embodiment of the operator circuit 15 in which the predetermined value in the operation circuit 15 is set to 4, i.e., the divisor is set at 4. FIG. 3 is an operation time chart of signals in the block diagram of FIG. 2. In FIG. 2, reference numerals 31-1 to 31-8 denote AND circuits, 32-1 to 32-8 denote binary counters, and 33 denotes a latch circuit. Predicted values $D_1$ to $D_8$ ($a'_{k-1}$ of FIG. 1) encoded with 8 bits are input to input terminals 30-1 to 30-8, and the AND circuits 31-1 to 31-8 perform an AND operation with a clock pulse $CK_1$. The binary counters 32-1 to 32-8, which are cleared by a picture frame period signal $CK_2$ received at a reset terminal count the number of bits of logic "1" in the picture frames and produce the remainders. Here, since the divisor has been set to 4, the binary counters 32-1 to 32-8 can be realized with 2-bit binary counters, and the measured values are the remainders of division by 4. The remainders that consist of 16 bits ($Q_{1-1}$-$Q_{8-2}$) are latched in the latch circuit 33 by a picture frame period check signal F and are sent as $r_k$ of FIG. 1 to output terminals 34-11, 34-12 to 34-81, 34-82. Although the divisor is set to 4 in the embodiment of FIG. 2, the system can be easily realized with the same setup when the divisor is set to $2^j$ (where j is a positive integer).

The above-mentioned operation will now be explained with respect to FIG. 3. In FIG. 3, $D_1$ is the least significant bit (LSB) of the eight bits which form the predicting signal $a'_{k-1}$, CK is an output of the AND circuit 31-1, $Q_1$ is an output of the binary counter 32-1, and $CKB_1$ is an output of the latch circuit 33. FIG. 3 shows the state of the path from the input terminal 30-1 to the output terminals 34-11, 34-12 as a typical example. The clock pulse $CK_1$ and the LSB bit $D_1$ are supplied to the AND circuit 31-1 so that the output CK synchronized with the clock pulse $CK_1$ is obtained at the output of the AND circuit 31-1. The output CK is supplied to the counter 32-1 as a clock input. The counter 32-1 counts the output CK, and the value of the outputs $Q_{1-1}$, $Q_{1-2}$ changes as shown in $Q_1$ for decimal values. The output of the counter 32-1 is latched every one frame by a frame clock F. Therefore, the output of the latch circuit 33 is changed as shown by $CKB_1$.

The predicted error $e_k$ subjected to code conversion by the code converter circuit 17 is multiplexed with the remainder $r_k$ from the operation circuit 15 and is sent to the transmission line 300 via a buffer memory 19.

Described below is the inter-frame decoding device 200 which receives coded signals from the transmission line 300. A separating circuit 22 receives the coded signals via a buffer memory 21 and separates the predicted error $b'_k$ and the remainder $r'_k$ produced by the operation circuit 15 from each other. The predicted error $b'_k$ after being separated is subjected to reverse conversion relative to that of the code converter circuit 17, in a code converter circuit 23 and thereby the predicted error $b'_k$ is decoded into a predicted error $e'_k$. The predicted error $e'_k$ which is decoded, is added by an adder 24 to a predicted value $a''_{k-1}$ which has been stored in a memory 25 and is thus changed into a decoded digital television signal $a''_k$. The decoded digital television signal $a''_k$ is sent to an output terminal 4 and is also written into the memory 25 as a predicted value for the next frame. The predicted value $a''_{k-1}$ is also input to an operation circuit 26 connected to a pulse generator circuit 27 that work in the same manner as the operation circuit 15 and the pulse generator circuit 16 in the inter-frame encoding equipment 100, whereby a remainder $r''_k$ is calculated.

As is obvious from the above description, the predicted values $a'_{k-1}$ and $a''_{k-1}$ of the same frame stored in the memories 14 and 25 are kept in agreement with each other after they have once been brought into agreement, unless an error occurs. In other words, the remainder $r_k$ of the predicted value $a'_{k-1}$ of the inter-frame encoding equipment 100 and remainder $r''_k$ of the estimated value $a''_{k-1}$ of the inter-frame decoding equipment 200 are kept in agreement with each other as a matter of course, unless an error occurs. Therefore, a transmission error can be detected by comparing, with the comparator 28, the remainder $r'_k$ of the operation circuit 15 with the remainder $r''_k$ of the operation circuit 26 in the inter-frame decoding equipment 200. A transmission error, however, cannot be instantly detected if an error has occurred in a plurality of picture elements so that the bits of logic "1" of the decoded predicted values $a'_{k-1}$, $a''_{k-1}$ cancel each other or if there are formed multiples of the divisor. Even in this case, however, the transmission error can be detected at a later time since it is left in the decoded predicted value $a''_{k-1}$, and the subsequent predicted values $a''_k$, $a''_{k+1}$,—change depending upon the input digital television signals $a_k$, $a_{k+1}$,—. When an operation circuit with a divisor like that in 4 of the embodiment of FIG. 2 is employed, as few as 16 redundancy bits need to be added to the picture frames to detect a transmission error.

Figure 4:
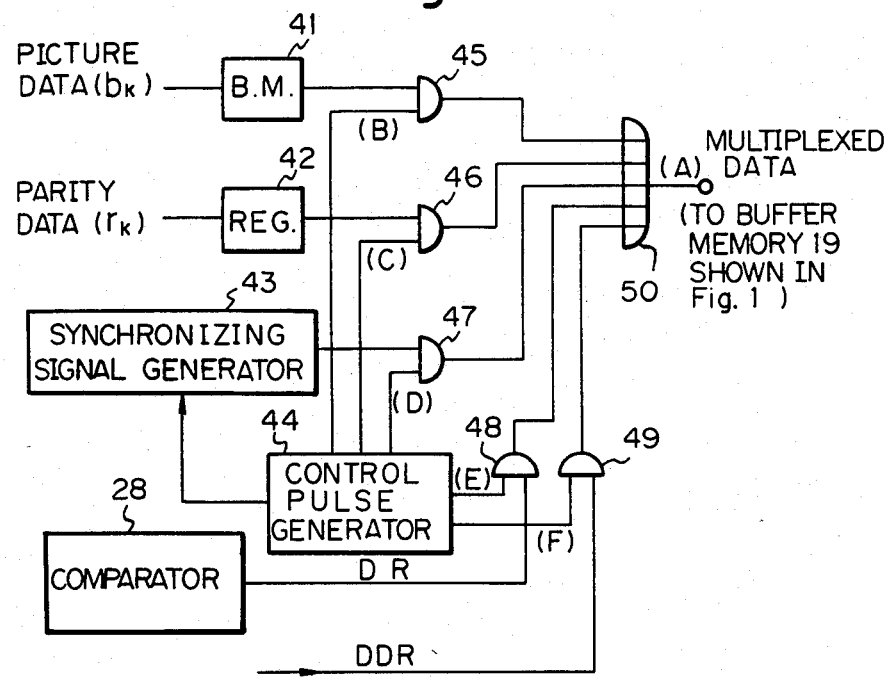
FIG. 4 is a block diagram illustrating the multiplexer circuit of FIG. 1.
Figure 5:
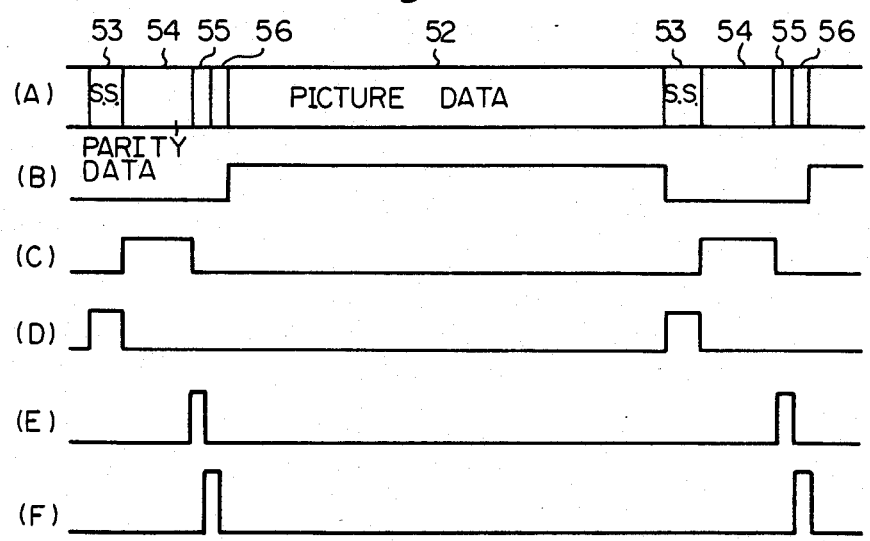
FIG. 5 is an operation time chart for the multiplexer circuit of FIG. 4.

FIG. 4 is a block diagram of the embodiment of the multiplexer 18 shown in FIG. 1. In FIG. 4, reference numeral 41 denotes a buffer memory which receives picture data from the code converter circuit 17, reference numeral 42 denotes a register which receives as parity data the remainder $r_k$ from the operation circuit 15, reference numeral 43 denotes a synchronizing signal generator, reference numeral 44 denotes a control pulse generator, reference numerals 45 to 49 denote AND circuits, and reference numeral 50 denotes an OR circuit. FIG. 5 is a time chart which illustrates the relationships between the frame format (A) output by the OR circuit 50 and the outputs (B), (C), (D), (E) and (F) of the control pulse generator 44. In FIG. 5(A), reference numeral 52 denotes picture data, reference numerals 53, 54, 55, and 56 denote a synchronizing signal, parity data, resending request signal, and a reset display signal, respectively. The output of the OR circuits is sent to the buffer memory 19 shown in FIG. 1.

As is clear from FIG. 5, the gate signals become a high level in the order of (D), (C), (E), (F) and (B), and the synchronizing signal 53, the parity data 54, the resending request signal (DR) 55, the reset display signal 56, and the picture data 52 pass through the AND circuits and are multiplexed in the OR circuit 50 for output. Therefore, the frame format is as shown in FIG. 5(A).

Further, if an error is detected in the receiving unit by detecting non-coincidence of the parity signals $r'_k$ and $r''_k$, the resending request signal (DR) 55 is sent to the sending side. When the sending side receives this signal 55, the sending side resends the picture data. That is, in the sending side, the input signal is quantized, coded, and sent. On the other hand, since it is necessary to inform the receiving side that the data is the resent data, the reset display signal 56 is multiplexed and sent.

Figure 6:
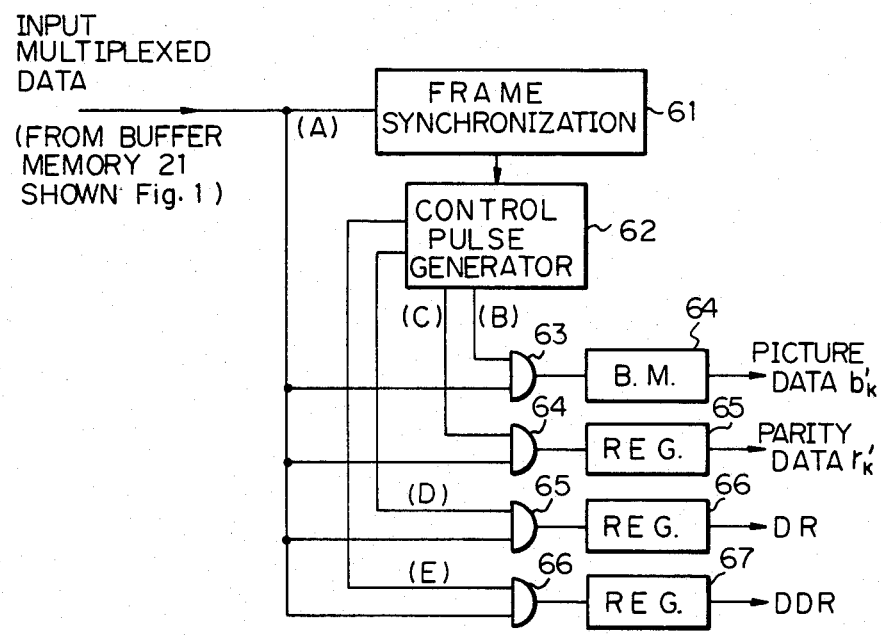
FIG. 6 is a block diagram illustrating the separating circuit of FIG. 1.

FIG. 6 is a block diagram of the embodiment of the separating circuit 22 shown in FIG. 1. In FIG. 6, reference numeral 61 denotes a frame synchronization circuit, reference numeral 62 denotes a control pulse generator, reference numerals 63 to 66 denote AND circuits, reference numeral 64 denotes a buffer memory which outputs picture data b'$_k$, reference numeral 65 denotes a register which outputs parity data r'$_k$, reference numeral 66 denotes a register which outputs a remote parity non-coincident detecting (reset) signal DR and reference numeral 67 denotes a register which outputs a remote reset display signal DDR.

Figure 7:
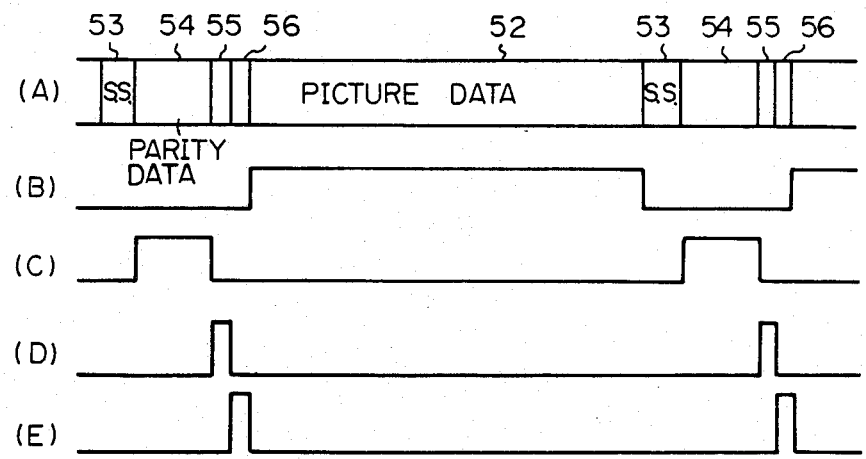
FIG. 7 is an operation time chart for the separating circuit of FIG. 6.

FIG. 7 is a time chart which illustrates the relationship between the frame format (A) and the control pulses (B), (C), (D) and (E) in FIG. 6. The operation of separating circuit 22 is explained next. When the format signal shown in FIG. 7(A) is input to the frame synchronization circuit 61, it is synchronized with the frame synchronization signal 53, and the gate pulses shown in FIGS. 7(B), 7(C), 7(D) and 7(E) are output from the control pulse generator 62 and input to the AND circuits 63, 64, 65, and 66, respectively. Therefore, the picture data 52, the parity signal 54, the parity non-coincident detecting data 55, and the reset signal 56 are stored via the AND circuits 63, 64, 65, and 66 into the buffer memory 64 and the registers 65, 66, and 67. The picture data b'$_k$ is input to the code converter circuit 23 to be decoded. Further, the parity data r'$_k$ is input to the comparator 28 and is compared with r"$_k$ from the operation circuit 26.

Figure 8:
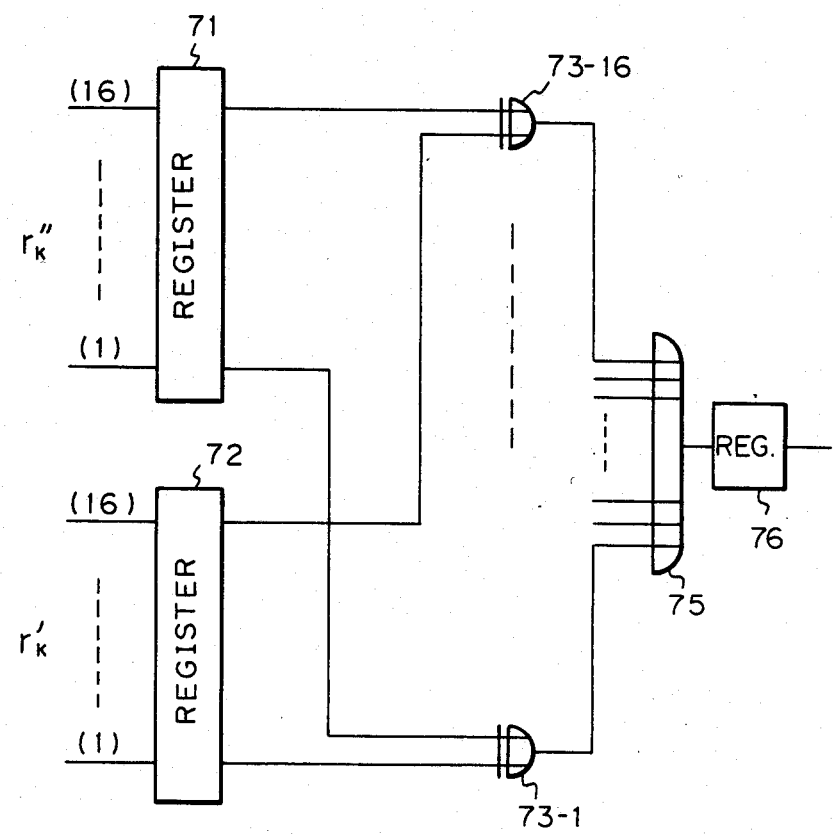
FIG. 8 is a block diagram illustrating the comparator of FIG. 1.

FIG. 8 is a block diagram of the embodiment of the comparator circuit 28 shown in FIG. 1. In FIG. 8, reference numerals 71 and 72 denote registers, reference numerals 73-1 and 73-16 denote exclusive OR circuits, reference numeral 75 denotes an OR circuit, and reference numeral 76 denotes a register. The output of the register 76 is connected to the terminal 5 shown in FIG. 1. The output r"$_k$ of the operation circuit 26 and the output r'$_k$ of the separating circuit 22 are supplied to the registers 71 and 72, respectively, and are compared by the exclusive OR circuits 73-1 and 73-16 and the error signal is output from the terminal 5.

Figures 9, 9A:
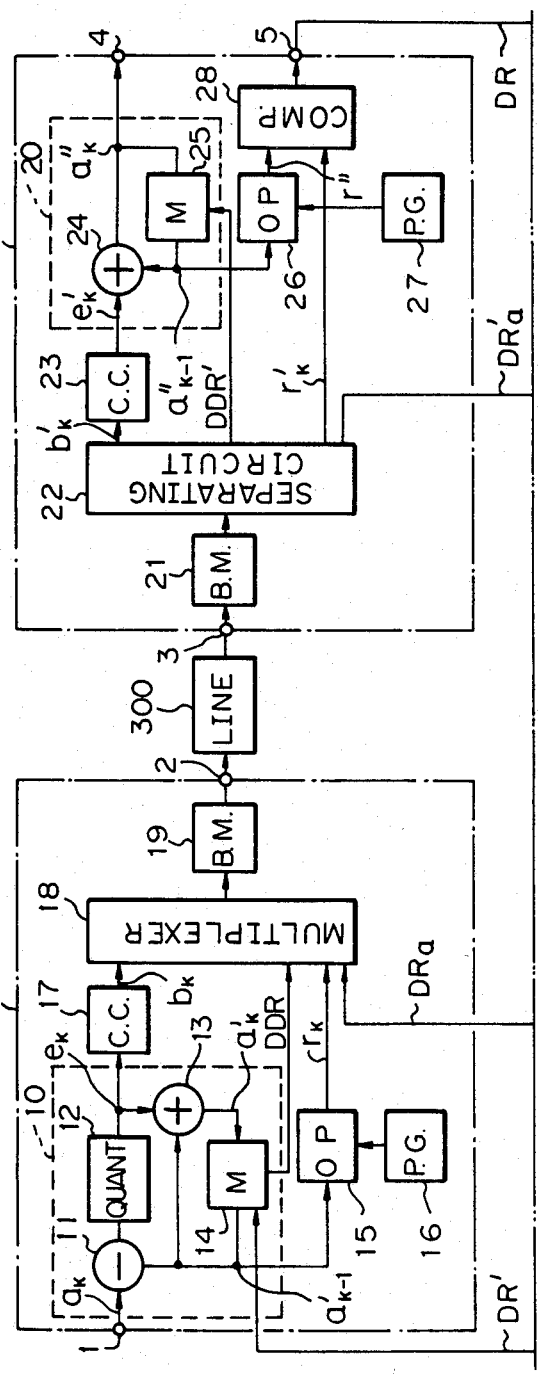
FIGS. 9A and 9B are a block diagram illustrating inter-frame encoding/decoding equipment using a system for detecting a transmission error according to the present invention.

FIG. 9 is a block diagram illustrating inter-frame encoding/decoding equipment using the system of the present invention. In FIG. 9, reference numeral 100S denotes inter-frame encoding equipment of the A station, reference numeral 100R denotes inter-frame decoding equipment of the A station, reference numeral 200R denotes inter-frame decoding equipment of the B station and reference numeral 200S denotes inter-frame encoding equipment of the B station. The embodiment of the inter-frame encoding and decoding equipment of each station is the same as that of FIG. 1.

Figure 9B:
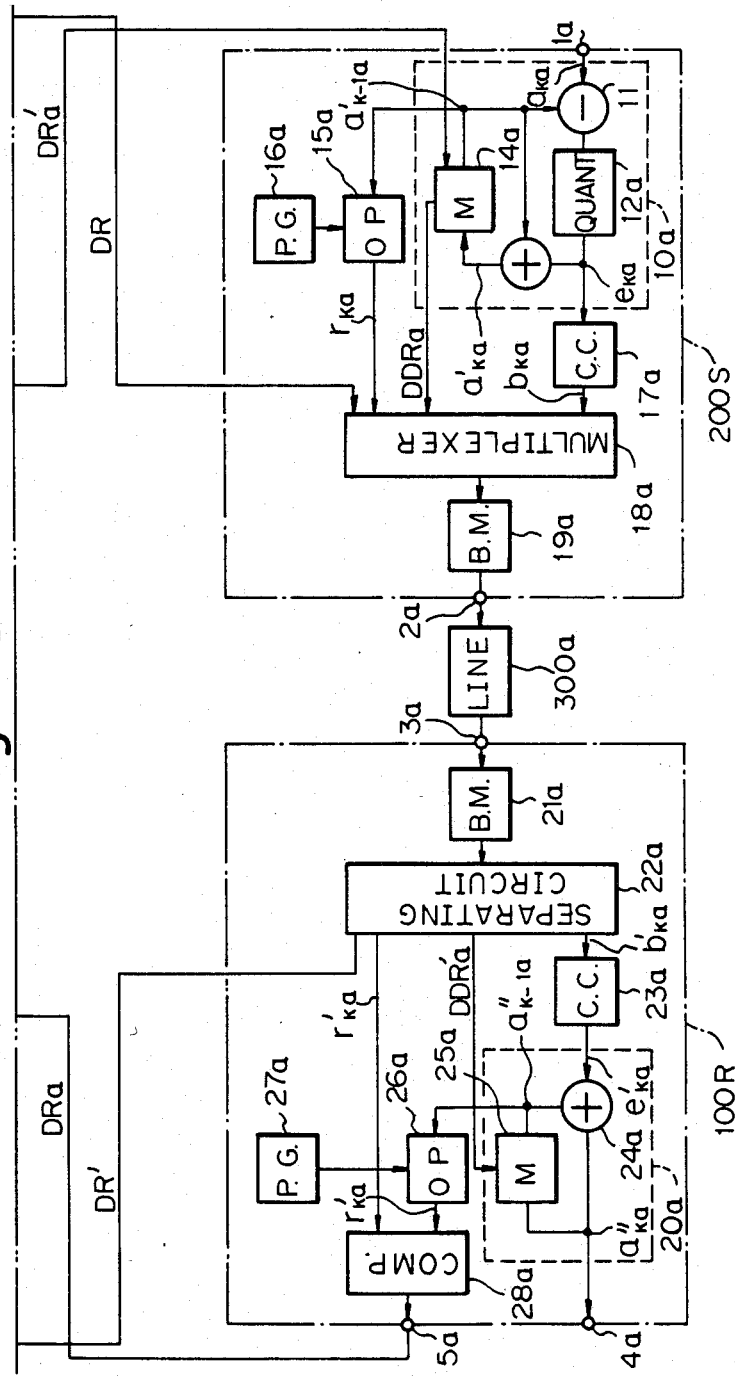

In the equipment illustrated in FIGS. 9A and 9B, when a non-coincidence of the parity is detected by the comparator circuit 28 in the B station, a resending (reset) request signal DR is multiplexed in the multiplexer 18a in the B station to be sent out to the inter-frame decoding equipment 100R in the A station. The reset request DR is received and separated in the separating circuit 22a in the A station, and the separated request signal DR' is transferred to the memory 14 in the A station and is processed to effect the resending (reset) process. The data which is reset processed is added to the reset display signal DDR in the multiplexer 18 and is sent to the B station. When the B station receives and detects the signal DDR in the separating circuit 22 as a signal DDR', the signal DDR' is applied to the memory 25 of the inter-frame decoding circuit 20 in the B station so that the inter-frame decoding equipment is changed to the resending (reset) processing mode. When a non-coincidence of the parity is detected by the comparator 28a in the A station, the resending request process is effected in the B station as shown by adding the index "a", that is, DRa→DR'a→DDRa→DDR'a shown in FIG. 9.

According to the transmission error detection system in the inter-frame encoding/decoding system of the present invention as described by way of the above embodiments a transmission error can be detected reliably by requiring the addition of a very small number of redundancy bits.

Although the embodiment of the present invention deals with a simple inter-frame encoding/decoding system, it can be easily implied that the invention is also applicable to any other complex inter-frame encoding/decoding system. Futher, the setup of bit groups and the value of divisors are in no way limited to those of the above-mentioned embodiments.

We claim:

1. A system for detecting a transmission error during transmission of television signals over a transmission line and non-coincidence of stored data in first and second frame memories having inputs and outputs, said system comprising:
    inter-frame encoding means, operatively connected to the transmission line and to receive the television signals, for encoding a difference between the television signals and the output of the first frame memory as an encoded signal to the sent over the transmission line, said inter-frame encoding means comprising:
        the first frame memory; and
        first operation means, operatively connected to one of the input and output of the first frame memory, for calculating a first error check word;
    inter-frame decoding means, operatively connected to the transmission line, for receiving the encoded signal sent from said inter-frame encoding means via the transmission line and for decoding the encoded signal by adding the output of the second frame memory to the encoded signal, said inter-frame decoding means comprising:
        the second frame memory; and
        second operation means, operatively connected to one of the input and the output of the second frame memory, for calculating a second error check word; and
    comparator means, operatively connected to the transmission line and said second operation means, for comparing and checking the first and second error check words calculated by said first and second operation means to detect the transmission error and non-coincidence of the stored data in the first and second frame memories.

2. A system for detecting a transmission error in picture data transmitted over a transmission line and non-coincidence of stored data in first and second frame memories, comprising:
    first inter-frame encoding equipment in an A station, operatively connected to the transmission line, for inter-frame encoding of the picture data prior to transmission;
    first inter-frame decoding equipment in a B station, operatively connected via the transmission line to said first inter-frame encoding equipment, for decoding the picture data;
    second inter-frame encoding equipment in the B station, operatively connected to the transmission line, for inter-frame encoding of the picture data prior to transmission; and second inter-frame decoding equipment in the A station, operatively connected via the transmission line to said second inter-frame encoding equipment, for decoding the picture data, said first and second inter-frame encoding equipment each comprising:
a first frame memory having an input and an output;
first operation error check work; and
a multiplexer unit, operatively connected to said first operation means and the transmission line, for combining the first error check word and the picture data; and said first and second inter-frame decoding circuits each comprising:
a second frame memory having an input and an output;
separation means, operatively connected to the transmission line, for separating the first error check word and the picture data;
second operation error check word; and
comparator means, operatively connected to said separating means, said second operation means and said multiplexer unit, for comparing and checking the first and second error check words calculated by said first and second operation means to detect the transmission error and to detect non-coincidence of stored data in the first and second frame memories, and for generating a resending request signal when non-coincidence of the first and second error check words is detected in the B station, the resending request signal being combined with the first error check word and the picture data in said multiplexer unit of the B station and sent to said separating circuit in the A station, the resending request signal being transferred to said first frame memory in the A station, resulting in the picture data being processed in a reset mode for transmission of the picture data in combination with a reset display signal, said second frame memory in the B station being placed in a reset processing mode by the reset display signal.

3. An error check system for an inter-frame encoding/decoding system which encodes data by detecting a difference between frames of the data, said error check system comprising:
an error code generator, comprising:
first creating means, operatively connected to receive one of the frames, for creating first remainder data from the one of the frames; and
combining means, operatively connected to said first creating means and to receive the difference between frames, for combining the first remainder data with the difference between frames; and
an error checker, operatively connected to said error code generator, comprising:
separating means, operatively connected to said combining means, for separating the first remainder data and the difference between frames;
second creating means, operatively connected to said separating means, for creating second remainder data from the one of the frames; and
comparing means, operatively connected to said separating means and said creating means, for comparing the first and second remainder data.

4. An error system according to claim 3,
wherein said first creating means comprises:
first predicted data means, operatively connected to receive the one of the frames, for generating first predicted data from the one of the frames;
first bit group means for separating the first predicted data into first bit groups; and
first dividing means, operatively connected to said first bit group means and said combining means, for dividing a first number of bits having a predetermined logic value in each of the first bit groups by a predetermined value to calculate the first remainder data, and
wherein said second creating means comprises:
second predicted data means, opeatively connected to said separating means, for generating second predicted data from the one of the frames;
second bit group means for separating the second predicted data into second bit groups; and
second dividing means, operatively connected to said second bit group means and said comparing means, for dividing a second number of bits having the predetermined logic level in each of the second bit groups by the predetermined value to calculate the second remainder data.

5. An inter-frame encoding/decoding apparatus for encoding television data to be transmitted over a transmission line and for decoding a received signal received over the transmission line from a similar inter-frame encoding/decoding apparatus, comprising:
a first frame memory for storing a first picture frame of the television data;
encoding means, operatively connected to said first frame memory and to receive the television data, for generating an encoded signal from a difference between the television data and the first frame;
first operation means, operatively connected to said first frame memory and the transmission line, for separating the first picture frame into first bit groups each having a first corresponding number of bits with a predetermined logic level and for calculating first remainders by dividing the first corresponding number in each of the first bit groups by a predetermined value;
decoding means, operatively connected to the transmission line, for decoding the received signal into a second picture frame;
a second frame memory, operatively connected to said decoding means, for storing the second picture frame;
second operation means, operatively connected to said second frame memory, for separating the second picture frame into second bit groups each having a second corresponding number of bits with the predetermined logic level and for calculating second remainders by dividing the second corresponding number in each of the second bit groups by the predetermined value; and
comparing means, operatively connected to said receiving means and said second operation means, for comparing the first and second remainders to detect a transmission error.

6. An inter-frame encoding/decoding apparatus according to claim 5, further comprising:
a multiplexer operatively connected to said encoding means, said first operation means and the transmission line; and a separating circuit operatively connected to the transmission line, said decoding means and said comparing means.

7. An inter-frame encoding/decoding apparatus according to claim 6,
wherein said comparing means is further operatively connected to said multiplexer and generates a reset request signal to be transmitted to the similar inter-frame encoding/decoding apparatus when the first and second remainders are non-coincident,
wherein said first frame memory is further operatively connected to said separating circuit to receive the reset request signal from the similar inter-frame encoding/decoding apparatus and in response transmits a whole picture frame and generates a reset display signal to indicate that the whole picture frame is being transmitted, and
wherein said second frame memory is further operatively connected to said separating circuit for receiving the reset display signal from the similar inter-frame encoding/decoding apparatus and enters a reset mode upon receiving the reset display signal, said second frame memory storing the whole picture frame in the reset mode.

8. A data checking method for inter-frame encoded data created using first frame data stored in a first frame memory, said memory comprising the steps of:
(a) operating on the first frame data to produce first error check data;
(b) transmitting the inter-frame encoded data and the error check data;
(c) decoding the inter-frame encoded data to produce second frame data stored in a second frame memory;
(d) operating on the second frame data to produce second error check data; and
(e) comparing the first and second error check data to verify error-free reception of the inter-frame encoded data and coincidence of the first and second frame data.

9. A method according to claim 8,
further comprising the step of (f) creating the inter-frame encoded data prior to step (b), comprising the substeps of:
(fi) subtracting the first frame data from input data to produce the inter-frame encoded data; and
(fii) adding the inter-frame encoded data to the first frame data to produce new first frame data; and
wherein step (a) comprises the steps of:
(ai) separating the first frame data into bit groups; and
(aii) dividing a corresponding number of bits having a predetermined logic level in each of the bit groups by a predetermined value to produce the error-check data for each of the bit groups.

10. A system for detecting a transmission error according to claim 2,
wherein said first and second inter-frame encoding and decoding equipment each provide a clock pulse and a picture frame period signal, and
wherein said first and second operation means each comprises:
a plurality of input terminals, operatively connected to one of the first and second frame memories, respectively;
a plurality of AND circuits, each having one input operatively connected to a corresponding one of said input terminals and another input operatively connected to receive the clock pulse;
a plurality of binary counters, each having an input operatively connected to one of said AND circuits and a reset terminal operatively connected to receive the picture frame period signal, for counting a number of bits having a predetermined logic level in a picture frame period and for producing an output; and
a latch circuit, having inputs operatively connected to the output of each of said binary counters, for latching the output of said binary counters for the picture frame period and for outputting the output of said binary counters as the first and second error check words, respectively.

11. A system for detecting and correcting a transmission error in picture data transmitting over a transmission line and non-coincidence of stored data in frame memories, comprising:
inter-frame encoding equipment in an A station, operatively connected to the transmission line, for creating encoded data by encoding the picture data, said inter-frame encoding equipment comprising:
a first frame memory having an input and an output;
first operation means, operatively connected to one of the input and the output of said first frame memory, for calculating a first error check word; and
a multiplexer unit, operatively connected to said first operation means and the transmission line, for combining the first error check word and the encoded data; and
inter-frame decoding equipment in a B station, operatively connected via the transmission line to said multiplexer unit in said inter-frame encoding equipment, for decoding the encoded data, comprising:
separation means, operatively connected to the transmission line, for separating the first error check word and the encoded data;
a second frame memory having an input and an output;
second operation means, operatively connected to said second frame memory, for calculating a second error check word; and
comparator means, operatively connected to said separation means, said second operation means and the transmission line, for comparing and checking the first and second error check words calculated by said first and second operation means to detect the transmission error and non-coincidence of stored data in said first and second frame memories, for generating a resending request signal when non-coincidence of the first and second error check words is detected in the B station, and for transmitting the resending request signal to said first frame memory in the A station, said inter-frame encoding equipment in the A station responding to the resending request signal by processing the picture data in a reset mode and producing a reset display signal for combination with the picture data in said multiplexer for transmission over the transmission line, said second frame memory in the B station responding to the reset display signal by entering a reset processing mode.

* * * * *